Feb. 15, 1966    T. R. GOULD    3,235,349
APPARATUS FOR PRODUCING GLASS FILAMENTS HAVING
A DISTRIBUTOR CUP WITHIN CENTRIFUGAL ROTOR
Filed Oct. 3, 1962

INVENTOR.
THOMAS R. GOULD
BY
ATTORNEY

United States Patent Office 3,235,349
Patented Feb. 15, 1966

3,235,349
APPARATUS FOR PRODUCING GLASS FILAMENTS HAVING A DISTRIBUTOR CUP WITHIN CENTRIFUGAL ROTOR
Thomas R. Gould, Martinsville, N.J., assignor to Johns-Manville Corporation, New York, N.Y., a corporation of New York
Filed Oct. 3, 1962, Ser. No. 228,137
1 Claim. (Cl. 65—14)

This invention relates generally to the production of fibers and more particularly to the forming of glass fibers by the attenuation of centrifugally initiated filaments of molten glass. More specifically the instant invention relates to means for depositing a plurality of streams of molten glass onto the base of the rotor used in the centrifugal initiation of filaments of the molten glass.

In the so-called rotary or centrifugal process for forming glass fibers, a molten stream of glass is deposited on a rapidly rotating rotor provided at its periphery with a rim having a plurality of openings formed therein through which the molten glass issues in the form of filaments. As the filaments issue from the openings at the rotor periphery, they are subjected to the action of a high velocity, high temperature gaseous blast to attenuate the filaments into fine diameter fibers. In one accepted practice of supplying molten glass to the base of the rotor, the molten glass is deposited therein at a position which is removed from the axis of rotation of the rotor. This eccentric deposition of the molten glass results in a non-uniform distribution of the glass to the peripheral wall of the rotor and this contributes to the formation of fibers having a broad range of diameters some of which may be undesirably coarse.

It is an object of the instant invention to provide apparatus for providing a uniform distribution of molten glass to the peripheral wall of a rotor in an eccentric loading system for a rotary system of fiberization.

The foregoing object is accomplished in accordance with the instant invention by a distributor cup which is secured to a stationary part of the fiberization equipment. The molten glass is supplied to the distributor cup and flows into a reservoir therein. The molten glass then flows out of the reservoir through a plurality of weirs in said cup to be deposited at a plurality of locations onto the base of the rotor. In the preferred embodiment of the instant invention, the distributor cup has four weirs which are spaced equally in a radial direction from the axis of rotation of the rotor and spaced equally in arcuate directions from each other.

The invention will be more fully understood and further objects and advantages thereof will become apparent when reference is made to the following detailed description of a preferred embodiment of the invention and the accompanying drawing in which.

Figure 1:
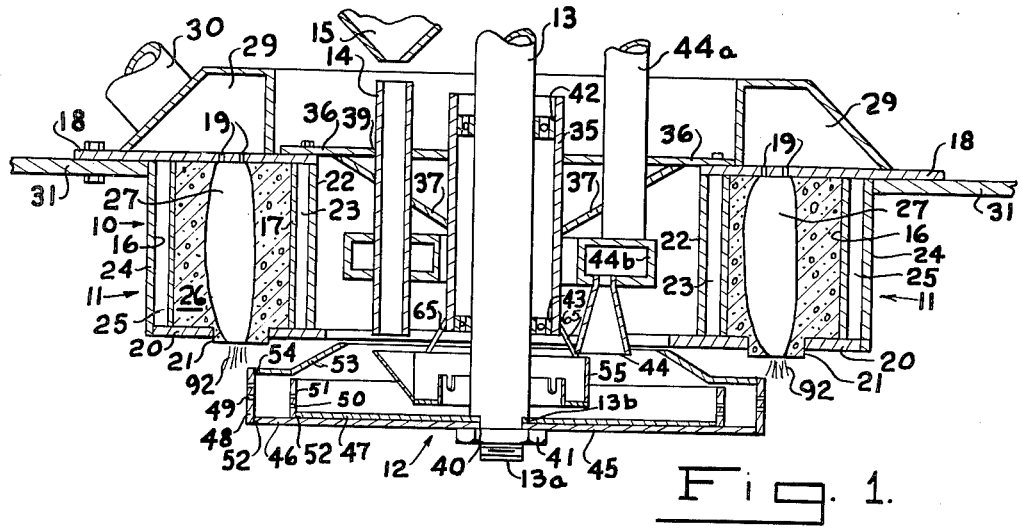
FIG. 1 is a view in cross section of an apparatus constructed for use in producing filaments of molten glass.

With reference to the drawings and particularly to FIG. 1 there is shown suitable apparatus 10 for forming glass fibers by the rotary process. The apparatus 10 comprises a combustion housing indicated generally by the numeral 11, a rotor indicated generally by the numeral 12, support shaft 13 for carrying the rotor, and an interior column 14 through which molten glass from a supply 15 is delivered to the distributing means 55 and then to the rotor 12.

The combustion housing 11 is of generally circular configuration and is defined by generally cylindrical exterior wall 16 and inwardly spaced wall 17. At its uppermost end, the combustion chamber is closed by a generally annular ring shaped plate 18 suitably joined to walls 16 and 17. The plate 18 is provided with a plurality of openings 19 for a purpose to be described later. A generally annular ring shaped lower plate 20 is joined to the walls 16 and 17 at their lower most extremities and has a generally annular opening 21 formed therein. A generally cylindrical inner wall 22 cooperates with the wall 17 to form a combustion chamber water jacket 23 and the wall 22 extends between and is joined to the upper and lower plates 18 and 20. Spaced outwardly from the wall 16 is a generally cylindrical wall 24, also joined to the upper and lower plates 18 and 20, and cooperating with the wall 16 to define a water jacket 25.

Between the walls 16 and 17, there is an inner refractory member 26 of ring-shaped configuration having a combustion chamber 27 which terminates in an annular opening 28 through which, as will be later described, hot products of combustion are emitted to attenuate glass filaments, projected from the rotor 12, into fibers. A combustible mixture of gases is fed into the combustion chamber 27 through the openings 19 which lead from a gas manifold 29 secured to the manifold 29. Mounting means 31 are provided for holding the apparatus in the desired position.

The rotor 12 is supported beneath the combustion chamber 11 on the shaft 13 which is mounted in a vertically extending bearing tube 35 supported by a circular plate 36 which is connected to and supported by the upper plate 18 of the combustion housing 11. Additional supporting beams 37 cooperate to hold the bearing tube in position. The plate 36 is provided with an opening 39 therein for receiving and supporting the tube 14 through which the molten glass, to be deposited in the distributing means 55, is poured. At its lowermost end, the rotatable drive shaft 13 has a threaded portion 13a of reduced cross-sectional area to form a shoulder 13b. The portion 13a extends through an opening 40 provided at the rotational axis of the rotor 12 which is secured to the shaft 13 for rotation therewith by being clamped between the shoulder 13b and a suitable nut 41. The drive shaft 13 is spaced from and supported within the tube 35 by means of spaced bearings 42 and 43. The shaft 13 is driven by a suitable motor (not shown).

Figure 2:
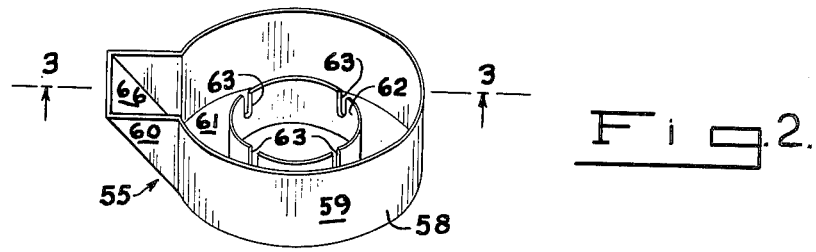
FIG. 2 is a pictorial representation of the distributor cup of the instant invention.

In the embodiment of the invention illustrated in FIGS. 1 and 2, the rotor 12 comprises a generally circular base 45 having a central opening 40 wherein said base 45 comprises superimposed sheets 46 and 47 of metal, each of which may be formed by a conventional sheet metal stamping operation. Sheets 46 and 47 are secured to each other by welding. The sheet 46 has an outside diameter greater than the outside diameter of the sheet 47. Secured to the sheet 46 adjacent the outer peripheral surface of openings 49 therein. Also, a peripheral band 50 having a plurality of openings 51 therein is secured to the sheet 47 adjacent the outer peripheral surface thereof. Each of the peripheral bands 48 and 50 may be formed from flat sheets of metal which are then rolled to the desired generally cylindrical shape that is similar to the outer peripheral surface of the circular sheets 46 and 47. Each of the peripheral bands 48 and 50 is then secured to its associated sheet 46 or 47 by welding indicated generally at 52. The openings 49 in the band 48 are offset axially and radially from the openings 59 in the peripheral band 50. A splatter and strength shield 53, comprising a sheet metal stamping is secured to the peripheral band 48 by welding indicated generally at 54. In some instances, when distributing means, such as disclosed in the instant invention, are utilized to effect circumferential spreading of the molten glass, the peripheral band 50 and sheet 47 may be omitted from the rotor.

In the drawing, there is illustrated means, indicated generally at 55, for receiving a supply 56 of molten glass and redistributing this supply as a plurality of streams of molten glass to spaced locations on the base 45 of the rotor 12. In the preferred embodiment of the invention, this distributor means comprises a distributor cup 58 having a generally annular outer wall 59 provided with a scoop 60 for receiving the molten glass. The scoop 60 directs the molten glass to a well 61 formed between the generally annular outer wall 59 and a generally annular inner wall 62. The molten glass flows out of the well 61 through a plurality of weirs 63, formed in the generally annular inner wall 62, as a plurality of streams 64 of molten glass to be deposited on the base 45 of the rotor 12. The distributor cup 58 is generally stationary and is secured to the bearing housing 35 by structural members 65.

Figure 3:
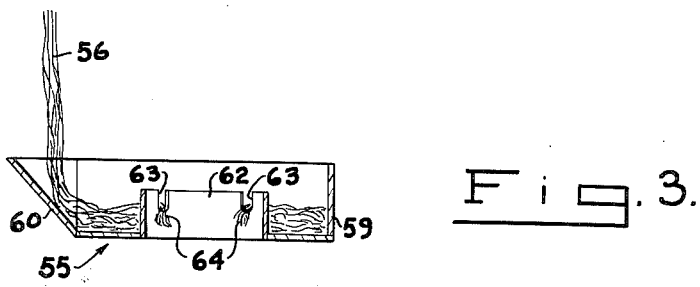
FIG. 3 is a view in cross-section taken on the plane passing through the line 3—3 of FIG. 2.

In the preferred embodiment of the invention, the generally annular distributor cup 58 is concentric with the rotor 12 and the drive shaft 13. Since the weirs 63 are formed on the generally annular inner wall, the streams 64 of molten glass will be deposited on the base 45 at locations spaced in a radial direction an even distance from the axis of rotation of the rotor 12. Also, the weirs 63 are formed in the generally annular inner wall in an arcuate direction approximately 90° apart. Although the distributor cup 58 of the preferred embodiment contains four weirs, it is to be understood that the number of weirs may be varied in accordance with the desired path of distribution of the supply of molten glass. Also, the distributor cup 58, itself, may comprise geometrical configurations other than the generally annular shape disclosed in FIGS. 1–3.

In order to maintain the desired viscosity of the molten glass after being deposited in the distributor cup 58 and on the rotor 12, there is provided suitable heating means comprising a plurality of burners 44 provided with combustibles and comburents through the tube 44a and the annular housing 44b. These burners may be arranged as desired so that the molten glass in the distributor cup and on the rotor are maintained at the desired viscosity.

In operation of the apparatus, molten glass 56 from the supply 15 is fed downwardly through the column 14 onto the surface 66 of the scoop 60. The molten glass flows into the well 61 and then out through the weirs 63 as a plurality of streams 64 of molten glass. These streams 64 of molten glass then fall to the surface of the base 45 of the rotor which is being rotated at a speed of about 2000 r.p.m. by appropriate means not shown. Due to the centrifugal forces generated by the rapid rotation of the rotor 12, the molten glass is thrown outwardly across the face of sheet 47 against the inner wall of the band 50. After striking the lower portion of the band 50, the molten glass in each of the streams 64 spreads circumferentially from the impact points and forms a thin layer adjacent the juncture of the band 50 and the sheet 47. Due to the centrifugal force generated by the rotating rotor 12 and the constant supply of molten glass to the rotor 12 through the plurality of streams 64, the molten glass is forced or lifted upwardly along the inner surface of the band 50 in the form of a plurality of thin upstanding annular walls or layers until it covers the area having the plurality of rows of openings 51 and is extruded therethrough. After passing through the openings 51, the molten glass then strikes against the solid lower portion of a peripheral band 48. Due to the centrifugal forces generated by the rotating rotor 12, the molten glass is forced or lifted upwardly along the inner surface of the band 48 until it reaches the openings 49. The molten glass then passes through the openings 49 in the form of thin semi-molten filaments which are attenuated to fine diameter fibers by the gaseous blast 92 emanating from the combustion chamber 11. Because of the spacing of the stream 64 in an arcuate path about the rotor and in particular the spacing of the streams through an arcuate distance of 90°, as illustrated in the drawing, the supply of molten glass 56 is distributed more uniformly to the complete inner peripheral surface of the band 50 and therefore the molten glass supplied to each opening 49 in the band 48 is constant throughout each revolution of the rotor 12. In this manner, fibers having more uniform diameters may be produced by the apparatus.

While the invention has been described in rather full detail, it will be understood that these details need not be strictly adhered to and that various changes and modifications may suggest themselves to one skilled in the art, all falling within the scope of the invention as defined by the subjoined claim.

What I claim is:

In apparatus for producing filaments of molten material which may be attenuated into fine fibers comprising a rotor having a base and a peripheral wall having a plurality of openings therein, and wherein said filaments are formed by depositing the molten material onto said base and urging said molten material over said base and out of said openings in said peripheral wall by centrifugal forces generated by rotation of said rotor, and wherein said rotor is rotated by a shaft extending vertically from the center of said rotor so that said molten material must be fed through the apparatus and deposited eccentrically of said base, the improvement wherein the molten material deposited eccentrically on said base is more uniformly distributed to said openings in said rotor comprising:

(a) a distributor cup having an annular bottom portion generally parallel to said base of said rotor,
(b) said distributor cup being supported in fixed position spaced in a vertical direction a distance from said base and within the periphery defined by said peripheral wall of said rotor,
(c) said distributor cup having generally annular inner and outer walls,
(d) said inner wall having a diameter smaller than the diameter of said outer wall,
(e) said inner and outer walls defining with said annular bottom portion a well in said distributor cup,
(f) means for supplying molten material to said well,
(g) said generally annular inner wall being concentric with said shaft and having a diameter greater than the diameter of said shaft,
(h) said generally annular inner wall having a plurality of openings therein through which the molten material flows to be deposited on the base of said rotor at distances spaced equally in a radical direction from said shaft of said rotor to be urged by centrifugal forces over said base and out through the openings in said peripheral wall, and
(i) said openings being equidistantly spaced circumferentially around the periphery of said inner wall.

References Cited by the Examiner

UNITED STATES PATENTS 2,964,786  12/1960  Levecque et al. _____ 65—15
3,044,110   7/1962  Hess _____ 65—14

DONALL H. SYLVESTER, *Primary Examiner.*